United States Patent
Milani De Oliveira et al.

(10) Patent No.: US 12,001,787 B2
(45) Date of Patent: Jun. 4, 2024

(54) ANALYZING PRESENTATIONS TO STRUCTURE METADATA FOR GENERATING QUESTIONS DIRECTED TO THE CONTENT OF THE PRESENTATIONS

(71) Applicant: Kyndryl, Inc., New York, NY (US)

(72) Inventors: Matheus Milani De Oliveira, Americana (BR); Marcio Andre Ribeiro Guimaraes, Campinas (BR); Guilherme Cartier De Palma, Americana (BR); Thiago Gomes Muntoreanu, Itu (BR); Gustavo De Paiva Almeida, Campinas (BR); Marcos Vinicius L. Paraiso, Campinas (BR)

(73) Assignee: KYNDRYL, INC., New York, NY (US)

( * ) Notice: Subject to any disclaimer, the term of this patent is extended or adjusted under 35 U.S.C. 154(b) by 655 days.

(21) Appl. No.: 17/144,578

(22) Filed: Jan. 8, 2021

(65) Prior Publication Data
US 2022/0222434 A1    Jul. 14, 2022

(51) Int. Cl.
*G06F 40/205* (2020.01)
*G06F 16/25* (2019.01)
*G09B 7/00* (2006.01)

(52) U.S. Cl.
CPC .......... *G06F 40/205* (2020.01); *G06F 16/258* (2019.01); *G09B 7/00* (2013.01)

(58) Field of Classification Search
USPC .............................................. 704/7–10, 257
See application file for complete search history.

(56) References Cited

U.S. PATENT DOCUMENTS

| | | | |
|---|---|---|---|
| 6,685,482 B2 | 2/2004 | Hopp et al. | |
| 8,602,793 B1 | 12/2013 | Sniedzins | |
| 9,028,260 B2 | 5/2015 | Nanjiani et al. | |
| 9,858,828 B1 | 1/2018 | Fuka | |
| 2014/0080110 A1* | 3/2014 | Nguyen | G09B 7/00 434/362 |
| 2015/0179082 A1 | 6/2015 | Byron et al. | |

(Continued)

OTHER PUBLICATIONS

Mell et al., "The NIST Definition of Cloud Computing", National Institute of Standards and Technology, Special Publication 800-145, Sep. 2011, pp. 1-7.

(Continued)

*Primary Examiner* — Leonard Saint-Cyr
(74) *Attorney, Agent, or Firm* — Tutunjian & Bitetto, P.C.; Dan Housley (57) ABSTRACT

A method for generating a series of questions from a presentation that includes receiving information materials for a presentation session, and converting the information materials into a text based data element. The method further includes comparing the text based data elements to a knowledge base directed to topics of interest to score the text based data elements for priority, and transforming text based data elements having a score above a threshold value into plurality of quiz metadata objects. The quiz metadata objects include context from the topics of interest. The method further includes generating quiz questions from the plurality of quiz metadata objects using the context and a set of templates of question types.

9 Claims, 6 Drawing Sheets

(56) References Cited

U.S. PATENT DOCUMENTS

| | | |
|---|---|---|
| 2018/0301046 A1 | 10/2018 | Nedivi |
| 2019/0180640 A1 | 6/2019 | Foster et al. |
| 2019/0221131 A1 | 7/2019 | Levinson |
| 2019/0378429 A1* | 12/2019 | Panuganty ............... G06F 40/10 |
| 2021/0076105 A1* | 3/2021 | Parmar ................. G06F 3/0425 |

OTHER PUBLICATIONS

Tanguy Raynaud et al., "Thematic Question Generation over Knowledge Bases", 10.1109/WI.2018.0-114. (2018), 1-8.

* cited by examiner

ANALYZING PRESENTATIONS TO STRUCTURE METADATA FOR GENERATING QUESTIONS DIRECTED TO THE CONTENT OF THE PRESENTATIONS

BACKGROUND

The present invention generally relates to methods for structuring metadata using context, and in some embodiments the structured metadata can be used to provide a series of questions on presentation subject matter.

Public speaking, such as in the case of teaching, whether in-class or remotely, can be challenging. Presenters while presenting subject matter to an audience may struggle to evaluate whether the audience is comprehending or even is paying attention to the ongoing session and its content. Additionally, there is an increasing concern in the teaching community whether teachers and schools are align questionnaires, e.g., testing, with the actual content presented.

SUMMARY

In accordance with an embodiment of the present invention, a computer implemented method for generating a series of questions from a presentation is described that includes receiving information materials for a presentation session; and converting the information materials into a text based data elements. In some embodiments, the method includes transforming text based data elements into plurality of quiz metadata objects. In some embodiments, the method continues with comparing the text based data elements to a knowledge base directed to topics of interest. The plurality of quiz metadata objects can include context derived from the topics of interest. The computer implemented method can then generate quiz questions from the plurality of quiz metadata objects using the context and a set of templates of question types.

In accordance with another embodiment of the present invention, a system is also described for generating a series of questions from a presentation. In some embodiments, the system includes an input receiver for receiving information materials for a presentation session, and a converter for converting the information materials into a text based data elements. In some embodiments, the system further includes a metadata engine for transforming text based data elements into plurality of quiz metadata objects. The quiz metadata objects include context from the topics of interest. In some embodiments, a quiz engine generates quiz questions from the plurality of quiz metadata objects using the context and a set of templates of question types.

In yet another embodiment, a computer program product is described for generating a series of questions from a presentation. The computer program product includes a computer readable storage medium having computer readable program code embodied therewith. The program instructions executable by a processor to cause the processor to retrieve information materials for a presentation session; and convert the information materials into a text based data elements. The computer product may also compare, using the processor, the text based data elements to a knowledge base directed to topics of interest to transform the text based into plurality of quiz metadata objects. The quiz metadata objects can include context from the topics of interest. The computer program product may also generate, using the processor, quiz questions from the plurality of quiz metadata objects using the context and a set of templates of question types.

BRIEF DESCRIPTION OF THE DRAWINGS

The following description will provide details of preferred embodiments with reference to the following figures wherein.

DETAILED DESCRIPTION

The present invention generally relates to methods for structuring metadata using context, and in some embodiments the structured metadata can be used to provide a series of questions on presentation subject matter. The methods, systems and computer program products of the present disclosure can provide mechanisms by which the providers of presentations, e.g., presenters, lectures, professors, teachers and other related presenters align questionnaires, e.g., testing, with the actual content of their presentations. Preparing content for presentations, speeches and learning lessons can be a time-consuming burden. In some instances, the information for the subject matter of a presentation can change quickly. In view of these challenges, as well as others, a presenter may have to continuous effort needed to not only keep the presentation content up-to-date, but for pre-defined questionnaires. In some embodiments, the methods, systems and computer program products that are described herein can expedite the preparation of questionnaires based on the content presented.

The methods, systems and computer program products that are described herein can automatically create a series of questions that are relevant to a presentation. In some instances, embodiments of the subject matter described herein can provide a mechanism by which the content of remote presentations is received by the remote audience. For those who are presenting or teaching content from a remote perspective, it can be difficult to ascertain whether an audience is concentrated on the subject matter being presented. For distance learning, such as schools and college, the instructor is unable to have an overview of the participant's behavior, not knowing whether they are still managing to keep attention on the topic presented topics. In some embodiments, the systems, methods and computer program products can provide an automated quiz that that enables teachers and presenters to receive valuable feedback over the class understanding of the content and improve as part of that feedback.

In some embodiments, a method to process unstructured data is provided that retrieves a content's context and topics, performs natural language content (NLC) analysis to correlate keywords for each topic to generate a metadata object that will be fed to a dynamic quiz engine. The dynamic quiz engine creates a series of questions relevant to the subject matter that was presented.

The data feed, e.g., the presentation material being analyzed, may be recorded sessions, slides, portable document folders (pdf) documents, and/or speaker speech can be used as a data feed either as a live feed or a feed from a recording of a presentation that was performed at an earlier time. Those can be processed by speech-to-text and other unstructured data processing mechanism.

In some embodiments, the methods, systems and computer program products may also use an apparatus to rank each metadata object based on a common knowledge database according to the relevance, and correctness. This knowledge base can be managed by a set of web crawlers and normalization processors.

The engine, e.g., dynamic quiz engine, can dynamically create questions, to promote audience participation, and to measure audience comprehension of the subject being presented in a lecture. The same presentation might take different routes depending on the audience participation and discussion, therefore, using this method, a presenter may not need to create pre-defined questions, but allow that function to be permed by the algorithm to create them based on the course of the presentation and content. The series of questions (also referred to as a dynamic quiz) can be delivered in real-time, i.e., during the speaker's (presenter's) presentation and/or after the same.

The methods, systems and computer program products can provide the capability to leverage the dynamic questions to support exam creation either consolidating multiple quizzes created dynamically or providing an assessment to be accomplished after presentation/class.

The method, systems and computer program products of the present disclosure are now described in greater detail with reference to FIGS. 1-6.

Figure 1:
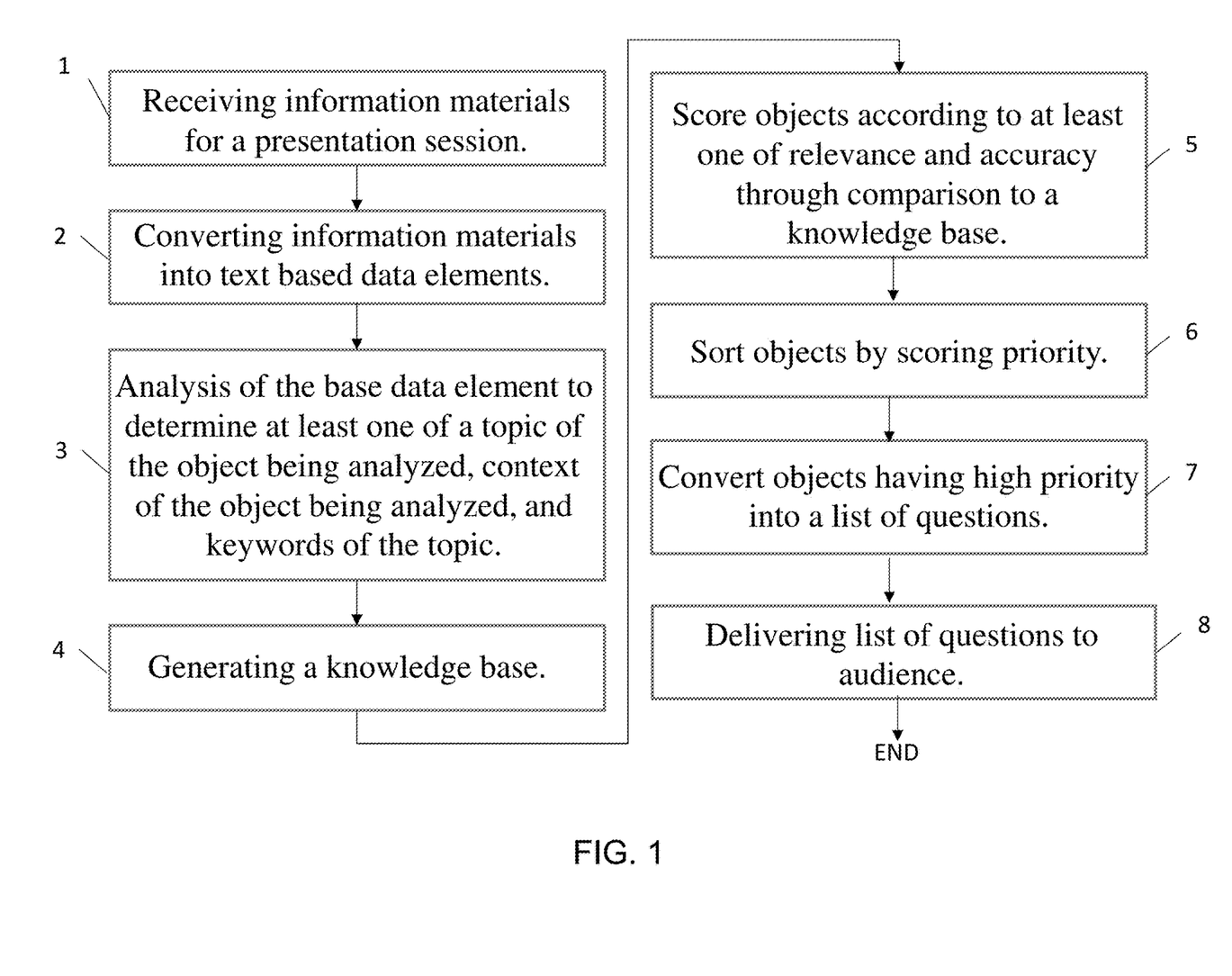
FIG. 1 is a block/flow diagram illustrating a method generating a series of questions from a presentation, in accordance with one embodiment of the present disclosure.
Figure 2:
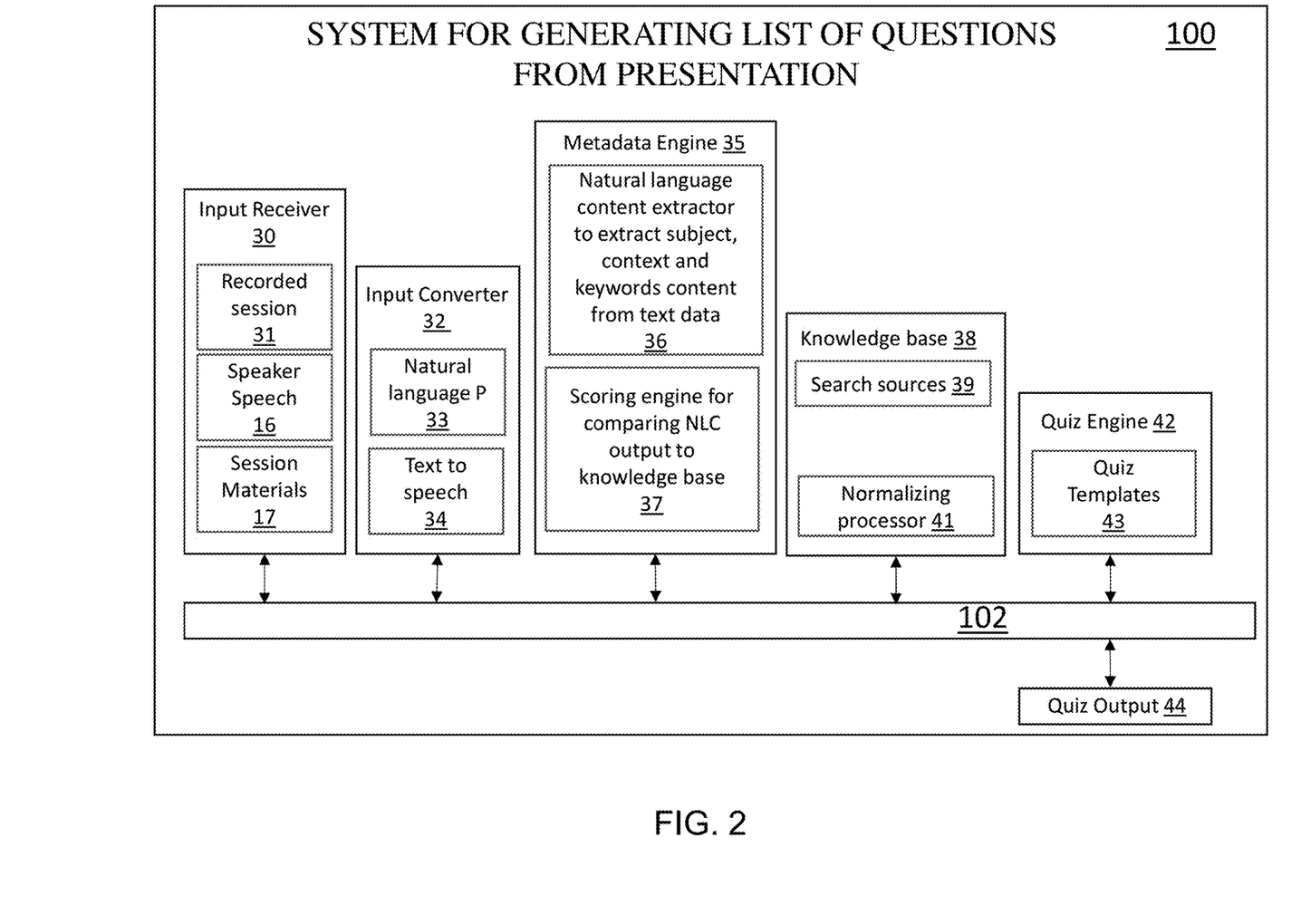
FIG. 2 is a block/flow diagram illustrating a system for generating a series of questions from a presentation, in accordance with one embodiment of the present disclosure.
Figure 3:
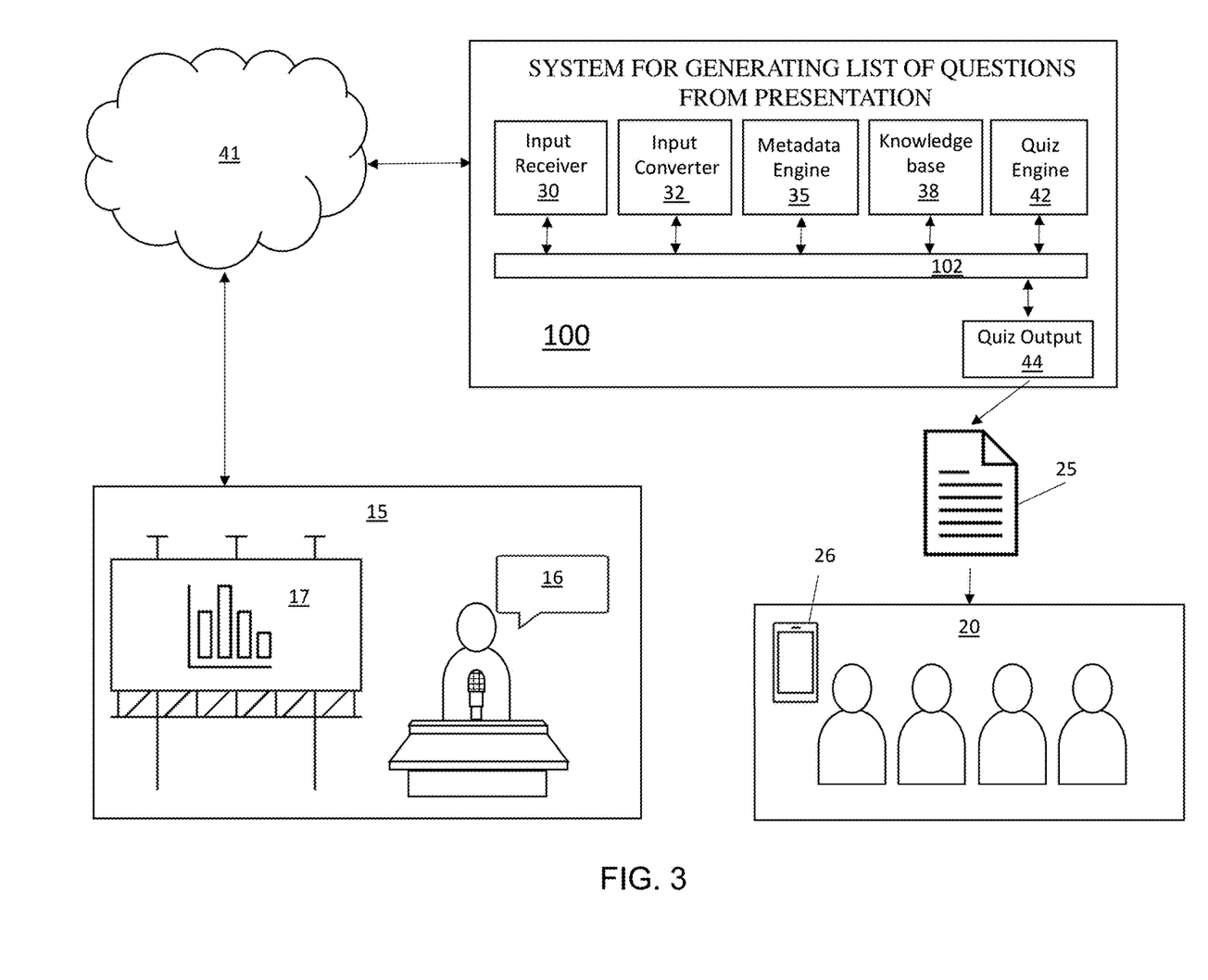
FIG. 3 is an illustration of the application for the methods and systems describe herein for generating a series of questions from a presentation, in which the series of questions is distributed to the audience for the presentation, in accordance with one embodiment of the present disclosure.

FIG. 1 is block/flow diagrams illustrating some embodiments for a method generating a series of questions from a presentation. FIG. 2 is a block diagram illustrating a system for generating a series of questions from a presentation, in accordance with one embodiment of the present disclosure. FIG. 3 is an illustration of the application for the methods and systems describe herein for generating a series of questions from a presentation, in which the series of questions is distributed to the audience for the presentation.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

FIG. 1 illustrates some embodiments of the proposed method. It is noted that the process flows illustrated by description of the blocks illustrated in FIG. 1 are not an exclusive list. A number of intermediate steps, preliminary steps and concluding steps (which are not specifically described) may also be applicable to the methods described herein.

In some embodiments, the computer implemented method for generating a series of questions from a presentation can be divided into four main sections, which can include an input processing section, a metadata engine processing section, a knowledge base section, and a quiz engine section.

Referring to FIG. 1, the method for generating a series of questions from a presentation may being with receiving information materials for a presentation session at block 1. Block 1 may include the beginning for the input processing section of the method. Referring to FIG. 3, the input may be the content that is being presented by the presenter 15 to the audience 20. The presentation by the presenter 15 to the audience 20 may be referred to as a "presentation session". In some embodiments, the presenter 15 may be a teacher, lecturer, professor, etc. It is noted that the aforementioned examples of the types of presenter 15 are provided for illustrative purposes only, and are not intended to limit the present disclosure. The presentation session may be performed at any venue, such as an educational institution, e.g., a lecturer hall or classroom of a elementary school, high school, preparatory school, vocational school, junior college, community college, college, university, graduate college, law school, medical program, etc. The presentation session may be between a live presenter 15 and a live audience 20, in which the audience 20 and the presenter 15 are at a same location, i.e., same physical venue. The presentation session may be between a live presenter 15 and a live audience 20, in which the audience 20 and the presenter 15 are at a different locations, i.e., at least one of the presenter 15 and the audience 20 are remote, e.g., at least one presenter 15 and at least one member of the audience 20 are at different physical locations. It is also not necessary that the presentation be live. In some embodiments, the presentation may be recorded (recorded speech 31), and may be shown to the audience 20 at a later time from when the presenter 15 recorded it.

The input processing section at block 1 can include input media, which can include but is not limited to: audio 16 from the recorded session, live audio input from the session, unstructured or structured materials for the session like presentation slides 17 (e.g., portable document format (pdf)), and combinations thereof. It is noted that the unstructured material may also be in text form.

Referring to FIG. 2, in some embodiments, the system for generating the series of questions from the presentation (system 100) may include an input receiver 30 for receiving information materials for a presentation session. The input receiver 30 may be an input for a live speaker speech 16, a recorded speech 31 or may be an input for presentation materials 17. The input may be a microphone based input or an input for receiving text in electronic form, e.g., digital form.

Referring to FIG. 3, in some embodiments, the presentation session may be in communication with the system for generating a series of questions from a presentation 100 through a network 40, which can be provided through the internet.

Referring to FIG. 1, the method, e.g., computer implemented method, can continue with converting the unstructured information materials into a text based data elements at block 2. In some embodiments, the input processing section can be responsible for receiving the inputs and transposing the input data to a plain text format. Block 2 of the method may include employ a natural language processing (NLP) algorithm, a speech-to-text algorithm, and other unstructured data processing methods. Referring to FIG. 2, the system 100 for generating a series of questions from a presentation may include a converter 32 for executing the process steps of block 2. For example, the converter 32 may include a processor, e.g., hardware processor, for executing a set of instructions, e.g., algorithms, that convert different types of content into text.

Block 2 of the method may include employ a natural language processing (NLP). Natural language processing (NLP) is a subfield of computer science, information engineering, and artificial intelligence concerned with the interactions between computers and human (natural) languages, in particular how to program computers to process and analyze large amounts of natural language data. Natural language processing frequently involves, natural language understanding, and natural language generation. Referring to FIG. 2, in one embodiment, the converter 32 of the system 100 for generating a series of questions from a presentation may include a natural language engine 33 including at least one form of memory, e.g., hardware memory, including natural language processing instructions for execution by a processor, e.g., hardware processor to convert forms of language into text.

Block 2 of the method may include a speech-to-text algorithm. Speech recognition is an interdisciplinary subfield of computer science and computational linguistics that develops methodologies and technologies that enable the recognition and translation of spoken language into text by computers. It is also known as automatic speech recognition (ASR), computer speech recognition or speech to text (STT). Both acoustic modeling and language modeling may be employed to provide elements of the statistically-based speech recognition algorithms. Hidden Markov models (HMMs) can be employed. Referring to FIG. 2, in one embodiment, the converter 32 of the system 100 for generating a series of questions from a presentation may include a speech to text engine 33 including at least one form of memory, e.g., hardware memory, including speech to text instructions for execution by a processor, e.g., hardware processor to convert forms of speech into text.

It is noted that natural language processing, and speech to text processing are only some examples for converting the data input into text. Other methodologies are equally applicable.

Referring to FIG. 1, the computer implemented method can continue with transforming text based data elements into plurality of quiz metadata objects, which can include blocks 3, 4 and 5. Referring to FIG. 2, the system 100 may include a metadata engine 35 for performing the steps associated with blocks 3 and 5 of FIG. 1. The metadata engine will be responsible to transform the input data (which has been pre-processed into text in block 2) into "quiz metadata data objects" which are composed by a syntactical analysis of a specific snippet of the input data. The syntactical analysis includes but is not limited to the topic of the object being analyzed, the context of the object being analyzed, and the keywords of the topic. The metadata engine 35 may also employ natural language content (NLC) processing similar to how the original data input is converted to text using natural language (NLP) processing. However, while the input converter 32 employs natural language processing (LCP) to convert speech or documents into normalized text data, the natural language content (NLC) processing being performed by the metadata engine 35 characterizes the text data according to at least one of content (subject), context, or keywords that have been predefined. Context can be a setting of a word or event. In semiotics, linguistics, sociology and anthropology, context refers to those objects or entities which surround a focal event, in these disciplines typically a communicative event, of some kind. Context is a frame that surrounds the event and provides resources for its appropriate interpretation.

Content (subject) and keywords can be predefined for the subject matter of presentation session between the presenter 15 and the audience 20. For example, a limited number of subjects may be considered, as the presentation is typically to a particular content. For example, a class presentation in an educational setting would be directed to a pre-set syllabus of topics. Referring to FIG. 2, the natural language content engine is identified by reference number 36 in the metadata engine 35 of the system 100, and natural language content engine is configured with a set of instructions saved on memory, e.g., hardware memory, to function (via a hardware processor) as an extractor to extract subject, context and keywords content from the text data that was pre-processed by the input converter 32. In some embodiments, the dynamic between the input method processor, e.g., input converter 32, and the metadata engine 35 composes a finite state machine, where the states are "read from input" and "build topic metadata", the transition occurs when the context or topic of the input changes. If the input is live its contents might be stored in an input cache while the metadata engine 35 is processing a new object.

"Metadata" is data that provide information about other data. Metadata can summarizes basic information about data, making finding and working with particular instances of data easier. In some embodiments, the metadata of produced by the metadata engine 35 is descriptive, and attaches to the data as a header. In some embodiments, a basic header for the "quiz metadata data objects" includes a main topic, context and time stamp. The metadata engine 35 may attach a header to the text data. Further, the header may also be time stamped.

Still referring to FIGS. 1 and 2, the context is extracted with the use of a natural language classifier processor. Once the context/topic is changed a new metadata object is created. The metadata object is composed but not limited to a header containing the context, timestamp, and topic. The object is also composed by a set of cross-referenced keywords that are extracted using the same NLC process.

Referring to FIG. 1, the computer implemented method may include blocks 4 and 5. Blocks 4 and 5 include scoring objects according to at least one of relevance and accuracy through comparison to a knowledge base 38. The objects have been provided by block 3, which may be generated with the natural language content engine 36 of the metadata engine 35. The aforementioned analysis by the metadata engine 35 can then validated against the knowledge base for inconsistency and relevance, which can give the metadata object a score. A high score denotes that the quiz metadata data objects substantially match subject matter, which can be factual, in the knowledge base 38. A low score denotes that the quiz metadata objects do not substantially match subject matter in the knowledge base 38. Highly scored quiz metadata objects can provide the subject matter for questions in the series of questions being generated, e.g., quiz. Lowly scored quiz metadata objects can be eliminated as suitable subject matter for questions in the series of questions being generated, e.g., quiz.

Referring to FIG. 1, block 4 of the computer implemented method may include generating a knowledge base 38. The knowledge base 38 is used to score and validate the quiz metadata objects with the metadata engine 35. Referring to FIG. 2, the knowledge base 38 can be a set of pre-processed knowledge on a large set of topics of interest. As previously noted, the topics of the presentation session may be pre-defined, and the topics of interest in the knowledge base 38 can be selected to correspond to the general topics of the presentation session. For example, a class presentation in an educational setting would be directed to a pre-set syllabus of topics, in which the topics are directed to the subject of the class, e.g., history, math, science, english, and similar subjects etc.

The construction of the knowledge base 38 can be done by the acquisition/implementation of "knowledge packs", which are pre-processed structured knowledge records on specific points of interest. Referring to FIG. 2, in some embodiments, to provide the knowledge base 38, a web crawler 40 is used in order to retrieve the knowledge base from an authorized data source 41. The authorized data source 41 may be a web page including content relevant to the presentation, e.g., speech, lecture, etc. The authorized data source 41 can be any informational source, which can be available through the internet. It is not required that the authorized data source 41 be of an educational type. The authorized data source may be publications of scientific research, as well as news publications. Any form of data that is published through a web site may provide the authorized data source.

A crawler is a computer program that automatically searches documents on the Web. In some embodiments, a crawler looks for information on the Web, which it assigns to certain categories, and then indexes and catalogues it so that the crawled information is retrievable and can be evaluated. In some embodiments, to provide the knowledge base for validating and scoring the quiz metadata data objects, the crawler extracts data from the authorized data source 41 relevant to the subjects of the presentations being given by the presenter 15.

In some embodiments, the knowledge base 38 includes a normalizing processor 42. The normalizing processor 42 functions to convert the data produced by the web crawler into data that can be compared to the quiz metadata data objects that have been processed with header designations for content, keywords and context that correlate the quiz metadata data objects to the presentation that was given by the presenter 15. The normalizing processor 42 may employ natural language processing (NLP) to normalize the data.

Referring to FIG. 1, block 5 of the computer implemented method for generating a series of questions from a presentation may include scoring the objects, e.g., quiz metadata data objects, according to at least one of relevance and accuracy through comparison to the knowledge base 38. First the context, content, and keywords of the quiz metadata data objects, which may be organized in a header for the metadata, is matched to content, keywords and context for normalized data from the authorized data source 41 of the knowledge base. Referring to FIG. 2, scoring the objects in block 5 may be provided by a scoring engine 37 for comparing NLC output to knowledge base. Highly scored quiz metadata objects can provide the subject matter for questions in the series of questions being generated, e.g., quiz. Lowly scored quiz metadata objects can be eliminated as suitable subject matter for questions in the series of questions being generated, e.g., quiz.

Scoring and relevance is accomplished by measuring the similarities between the context, content, and keywords of the quiz metadata data objects and the context, content, and keywords of the knowledge base. In some examples, the scoring engine 37 can employ artificial intelligence in measuring the similarities of the quiz metadata objects and the knowledge base. Artificial intelligence (AI) is the simulation of human intelligence processes by machines, especially computer systems. These processes include learning (the acquisition of information and rules for using the information), reasoning (using rules to reach approximate or definite conclusions) and self-correction.

The scoring engine 37 may include neural networks, expert systems, genetic algorithms, intelligent agents, logic programming, and fuzzy logic. Neural network artificial intelligence is based loosely upon the cellular structure of the human brain. Cells, or storage locations, and connections between the locations are established in the computer. As in the human brain, connections among the cells are strengthened or weakened based upon their ability to yield "productive" results. The system uses an algorithm to "learn" from experience. Neural nets are an inductive reasoning method. Expert systems are usually built using large sets of "rules." Genetic algorithms utilize fitness functions, which are relationships among criteria, to grade matches.

In one example, the scoring engine 37 includes an artificial neural network providing device. An artificial neural network (ANN) is an information processing system that is inspired by biological nervous systems, such as the brain. The key element of ANNs is the structure of the information processing system, which includes a large number of highly interconnected processing elements (called "neurons") working in parallel to solve specific problems. ANNs are furthermore trained in-use, with learning that involves adjustments to weights that exist between the neurons. An ANN is configured for a specific application, such as pattern recognition or data classification, through such a learning process.

Referring to FIG. 1, the method may further include generating a list of questions from the properly scored metal data, as illustrated in blocks 6, 7 and 8. Block 6 includes sorting objects by scoring priority, as designated by the scoring engine 37. Block 7 includes converting objects having high priority into a list of questions. Block 8 includes delivering the list of questions to audience. Blocks 6 and 7 may be performed by a quiz engine 42 of the system for generating questions from a presentation 100.

In some embodiments, the quiz engine 42 can be responsible for retrieving the metadata objects, sort them by priority and build quiz questions based on the subjects and keywords of each object and in a set of templates of question types. The quiz engine 42 may include a database of quiz templates 43. Each metadata object can be adapted to any quiz template. The quiz engine 42 might also consult the knowledge base 38 if the metadata object score is too low in order to potentially present the content inconsistency to the final user in the delivery system.

FIG. 3 illustrates one embodiment of an application for the computer implemented methods for generating a plurality of questions from a presentation, as illustrated in FIG. 1, or the system for generating the plurality of questions from a presentation, as illustrated in FIG. 2. The Still referring to FIG. 3, illustrates one embodiment of a presenter 15, such as a teacher or professor, to an audience 20, which may be a plurality of students. The presentation may be a live speech 16, a recorded speech, presentation slides 17, videos, online books, databases, web searches or any other type of document. The presentation may be a data feed to the system 100 for generating the series of questions from the presentation. The input may be over a network 41 that includes the internet. The data feed to the system 100 may be through the input receiver 30. As described above with reference to blocks 1-7 of FIG. 1, the system 100 generates a list of questions 25 from the presentation data.

In some embodiments, the list of questions 25 may be delivered directly to the audience 20. The list of questions 25 may be formatted into an electronic document for delivery to a mobile device 26 of at least one participant in the audience. The list of questions 25 may be formatted into a format for transmission to the audience and delivered by a quiz output 44 of the system 100 for generating the list of questions from the presentation. The audience 20 may view the list of questions on the display of the mobile device 26. The audience 20 may answer the questions through an interface with the mobile device 26. The list of questions may be in the form of a quiz. The quiz score can indicate the attentiveness of the audience to the presentation, and/or whether the content of the presentation is being understood by the audience. The quiz score can be fed back to the presenter 15. In some instances, the quiz can be given at a time while the presentation is being made to the audience 20. In other instances, the quiz can be given to the audience 20 at the conclusion of the presentation. In yet other examples, the quiz can be recorded and given to the audience 20 at a later time after the conclusion of the presentation.

FIG. 2 illustrates one embodiment of the system 100 for generating the series of questions from the presentation. In some embodiments, the system 100 includes an input receiver 30 for receiving information materials for a presentation session, and a converter 32 for converting the information materials into a text based data elements. In some embodiments, the system further includes a metadata engine 35 for transforming text based data elements into plurality of quiz metadata objects. The quiz metadata objects include context from topics of interest correlated to knowledge base 38. In some embodiments, a quiz engine 35 generates quiz questions from the plurality of quiz metadata objects using the context and a set of templates 43 of question types. The series of questions may be delivered in the format of a quiz (series of questions depicted in FIG. 3) from an output 44 of the system 100. Each of the input receiver, input converter 32, metadata engine 35 and the knowledge base 38 may be interconnected and operatively coupled to a system bus 102. The bus 102 interconnects a plurality of components as will be described herein The system 100 for generating a plurality of questions from the presentation may be integrated into the processing system 400 depicted in FIG. 4. The processing system 400 includes at least one processor (CPU) 104 (also referred to as hardware processor) operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102. The bus 102 interconnects a plurality of components as will be described herein.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

These and other variations of a hardware processor subsystem are also contemplated in accordance with embodiments of the present invention.

Figure 4:
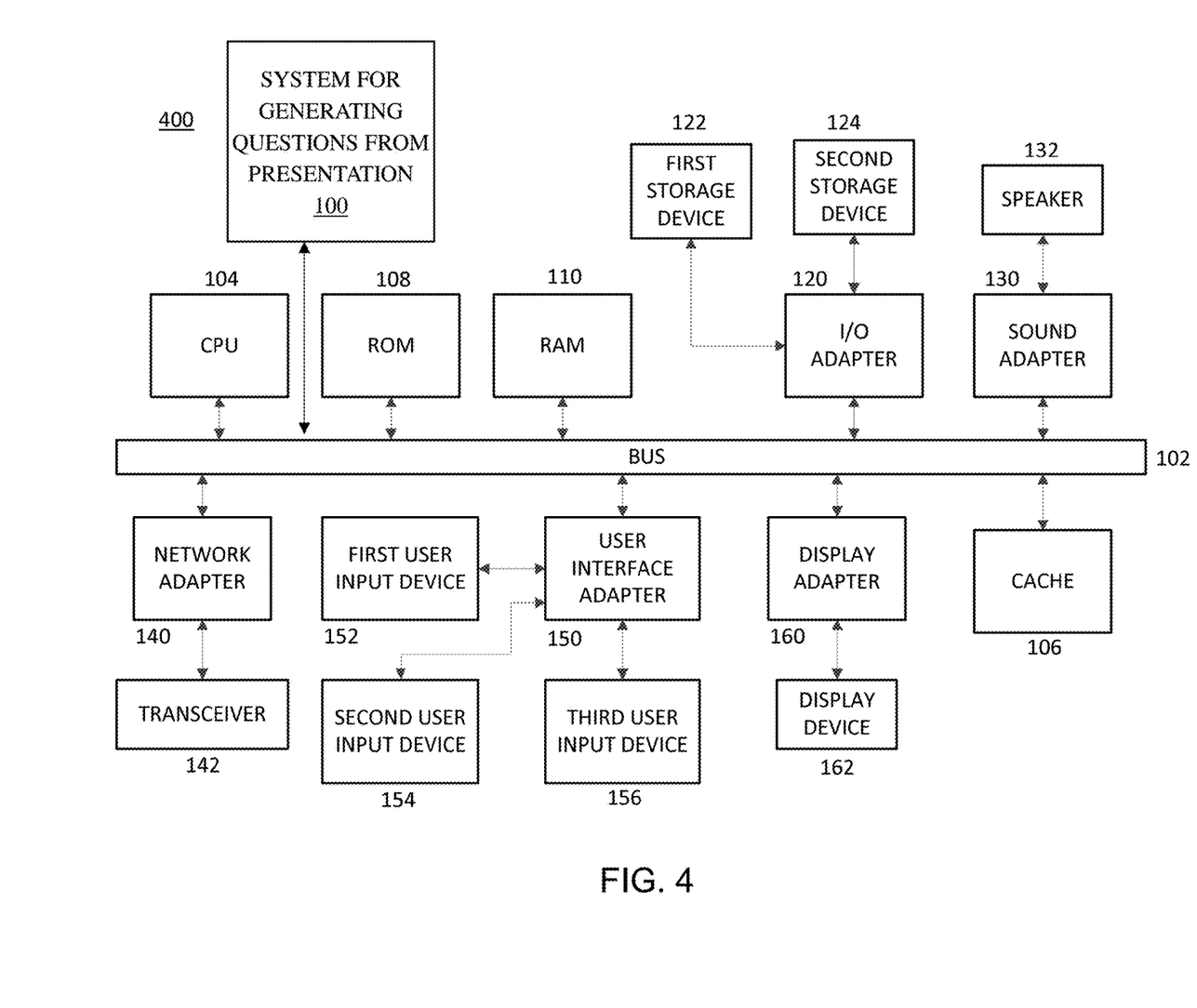
FIG. 4 is a block diagram illustrating a system that can incorporate the system for a series of questions from a presentation that is depicted in FIG. 5, in accordance with one embodiment of the present disclosure.

The system 400 depicted in FIG. 4, may further include a first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from system 400.

Of course, the processing system 400 may also include other elements (not shown), as readily contemplated by one of skill in the art, as well as omit certain elements. For example, various other input devices and/or output devices can be included in processing system 400, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 400 are readily contemplated by one of ordinary skill in the art given the teachings of the present invention provided herein.

The present invention may be a system, a method, and/or a computer program product at any possible technical detail level of integration. The computer program product may include a computer readable storage medium (or media) having computer readable program instructions thereon for causing a processor to carry out aspects of the present invention.

For example, the present disclosure provides a computer program product including a non-transitory computer readable storage medium having computer readable program code embodied therein for providing a plurality of questions from a presentation. In some embodiments, the computer program product for providing plurality of questions from a presentation includes a computer readable storage medium having computer readable program code embodied therewith, the program instructions executable by a processor to cause the processor to retrieve information materials for a presentation session; and convert the information materials into a text based data elements. The computer product may also compare, using the processor, the text based data elements to a knowledge base directed to topics of interest to transform the text based into plurality of quiz metadata objects. The quiz metadata objects can include context from the topics of interest. The computer program product may also generate, using the processor, quiz questions from the plurality of quiz metadata objects using the context and a set of templates of question types.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The methods of the present disclosure may be practiced using a cloud computing environment. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 5:
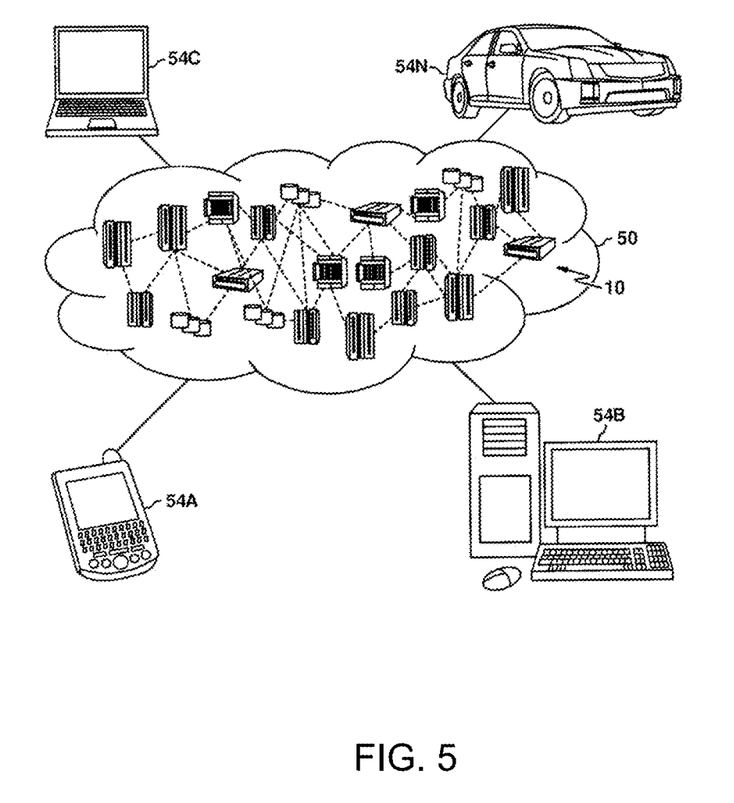
FIG. 5 depicts a cloud computing environment according to an embodiment of the present disclosure.

Referring now to FIG. 5, illustrative cloud computing environment 50 is depicted. As shown, cloud computing environment 50 includes one or more cloud computing nodes 51 with which local computing devices used by cloud consumers, such as, for example, mobile and/or wearable electronic devices 54A, desktop computer 54B, laptop computer 54C, and/or automobile computer system 54N may communicate. Nodes 110 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 51 and cloud computing environment 50 can communicate with any type of computerized device over any type of network and/or network addressable connection (e.g., using a web browser).

Figure 6:
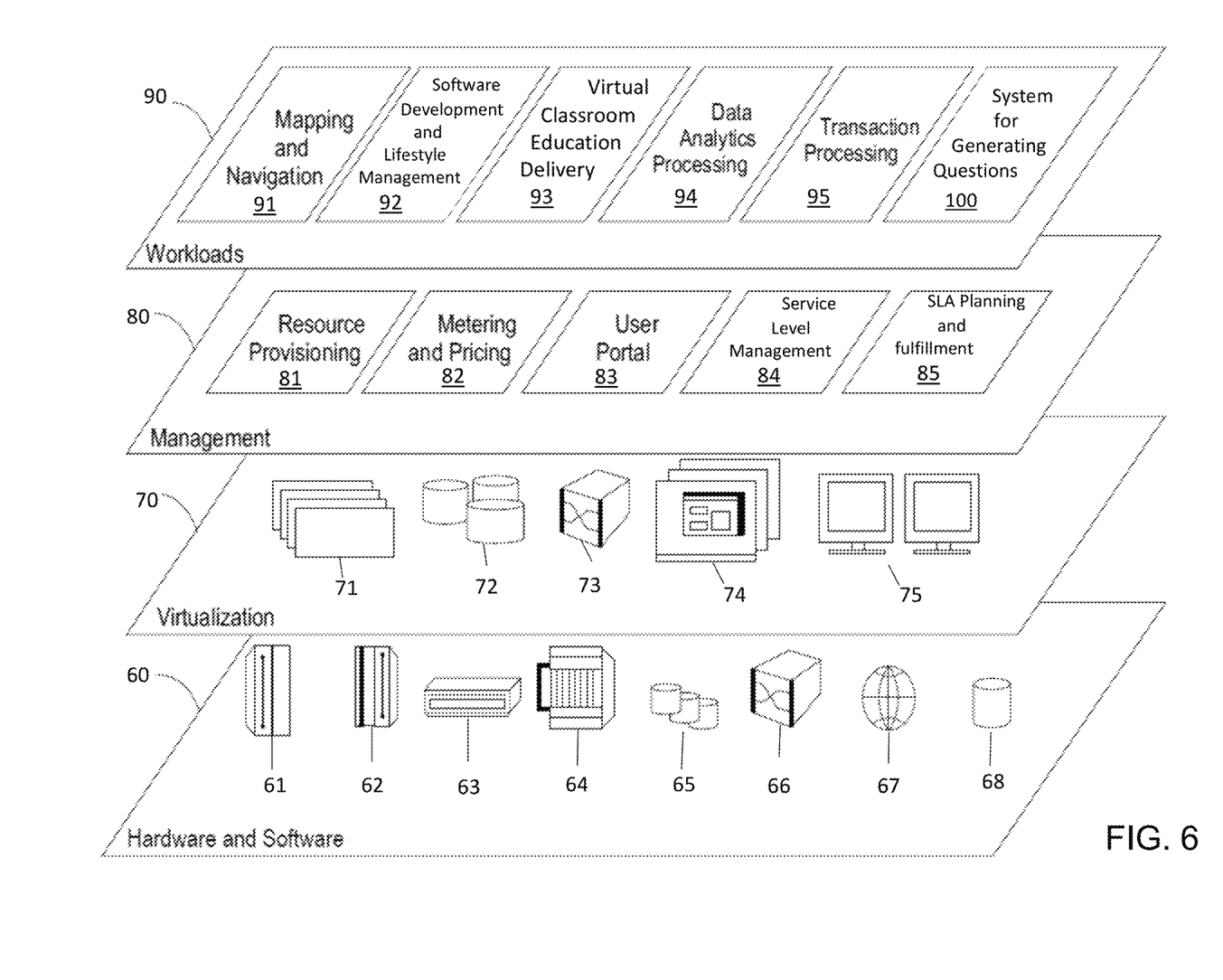
FIG. 6 depicts abstraction model layers according to an embodiment of the present disclosure.

Referring now to FIG. 6, a set of functional abstraction layers provided by cloud computing environment 50 (FIG. 1) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and system 100 for generating a plurality of questions from a presentation, which is described with reference to FIGS. 1-3.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

Having described preferred embodiments of a system for generating a plurality of questions from a presentation, it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer implemented method for generating a series of questions from a presentation comprising:
   receiving information materials for a presentation session;
   converting the information materials into text based data elements;
   transforming the text based data elements into a plurality of quiz metadata objects, the plurality of quiz metadata objects including context from topics of interest correlated to a knowledge base obtained using a web crawler according to authorized data on web pages, wherein said transforming text based data elements into said plurality of quiz metadata objects comprises using a syntactical analysis of a portion of the information selected from the group consisting of a topic of an object being analyzed, a context of the object being analyzed, keywords of a topic of an object being analyzed, an accuracy score of the object according to the knowledge base and combinations thereof;
   comparing the text based data elements to the knowledge base directed to topics of interest using an artificial neural network to score the text based data elements for priority in relevance to the presentation session; and
   generating quiz questions in order of the priority from the plurality of quiz metadata objects using the context and a set of templates of question types.

2. The computer implemented method of claim 1, wherein the information materials for the presentation session are selected from the group consisting of audio from a recorded session, live audio input from a live session, presentation files and combinations thereof.

3. The computer implemented method of claim 1, wherein said converting the information materials into text based data elements comprises natural language processing.

4. The computer implemented method of claim 1, wherein said converting the information materials into text based data elements comprises speech to text processing.

5. The computer implemented method of claim 1, wherein said comparing the text based data elements to the knowledge base directed to topics of interest to score the text based data elements for priority comprises a database that verifies the validity of the text based elements.

6. The computer implemented method of claim 1, wherein said generating quiz questions from the plurality of quiz metadata objects comprises subjects and keywords from the quiz metadata objects.

7. A system for generating a series of questions from a presentation comprising:
   a receiver having a connection for entry of data from a presentation session;
   a converter for converting information materials into text based data elements;
   a metadata engine including memory containing a set of instructions to be executed by a processor for transforming text based data elements into plurality of quiz metadata objects, the quiz metadata objects including context from topics of interest corresponding to a knowledge database obtained using a web crawler according to authorized data on web pages, and a priority scorer for comparing, the text based data elements to the knowledge base directed to topics of interest using an artificial neural network to score the text based data elements for priority in relevance to the presentation session wherein the priority scorer includes a crawler for matching text from the text based data elements to the knowledge base directed to topics of interest, wherein said priority is correlated to highest degrees of said matching text, and said metadata engine includes a hardware processor for executing instructions saved on memory of the system for transforming the text based data elements having the score above a threshold value into said plurality of quiz metadata objects using a syntactical analysis of a portion of the information selected from the group consisting of a topic of an object being analyzed, a context of the object being analyzed, keywords of a topic of an object being analyzed, an accuracy score of the object, according to the knowledge base and combinations thereof; and a question generating quiz questions in order of the priority from the plurality of quiz metadata objects using the context and a set of templates of question types.

8. The system of claim 7, wherein an input receiver for said receiving information materials comprises a data input of data selected from the group consisting of audio from a recorded session, live audio input from a live session, presentation files and combinations thereof.

9. The system of claim 7, wherein the converter for converting the information materials into said text based data elements comprises memory storing instructions for a natural language processing application, the instructions for actuating a hardware processor for converting the data into text.

* * * * *